United States Patent [19]

Murray

[11] Patent Number: 4,901,469
[45] Date of Patent: Feb. 20, 1990

[54] EXPANSIBLE FRAME FOR MOUNTING DOWNRIGGERS

[76] Inventor: Mark T. Murray, 1060 E. Long Lake Rd., Bloomfield Hills, Mich. 48013

[21] Appl. No.: 338,575

[22] Filed: Apr. 17, 1989

[51] Int. Cl.⁴ .............................................. A01K 97/10
[52] U.S. Cl. ....................................................... 43/21.2
[58] Field of Search ............................. 43/21.2, 43.12; 248/512, 515, 538

[56] References Cited

U.S. PATENT DOCUMENTS

| | | | |
|---|---|---|---|
| 3,193,964 | 7/1965 | Hurst | 43/43.12 |
| 3,765,118 | 10/1973 | Reitler | 43/43.12 |
| 3,778,918 | 12/1973 | Emory, Sr. | 43/43.12 |
| 3,968,587 | 7/1976 | Kammeraad | 43/27.4 |
| 4,085,473 | 4/1978 | Franklin | 9/1.7 |
| 4,157,803 | 6/1979 | Mack | 248/512 |
| 4,315,612 | 2/1982 | Levine et al. | 248/538 |
| 4,388,774 | 6/1983 | Thoemke | 43/21.2 |
| 4,527,349 | 7/1985 | Emory, Jr. | 43/21.2 |
| 4,696,124 | 9/1987 | Wille | 43/43.12 |
| 4,753,029 | 6/1988 | Shaw et al. | 248/538 |
| 4,823,723 | 4/1989 | Brooks | 248/538 |

*Primary Examiner*—M. Jordan
*Attorney, Agent, or Firm*—Krass & Young

[57] ABSTRACT

An expansible device attachable to the stern of a boat for mounting fishing rigs such as downriggers thereon. The device includes a framework which extends horizontally across the stern of the boat, with a pair of expansible members disposed near the outboard edges of the framework. The expansible members include extensions telescopically received in the framework which move from a retracted position to an extended, outboard position by means of linear actuators to provide an extended mounting area.

13 Claims, 2 Drawing Sheets

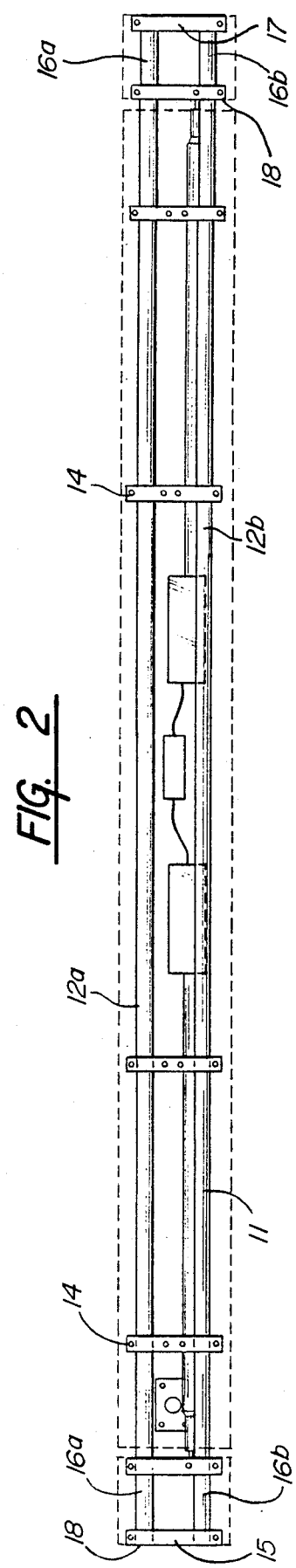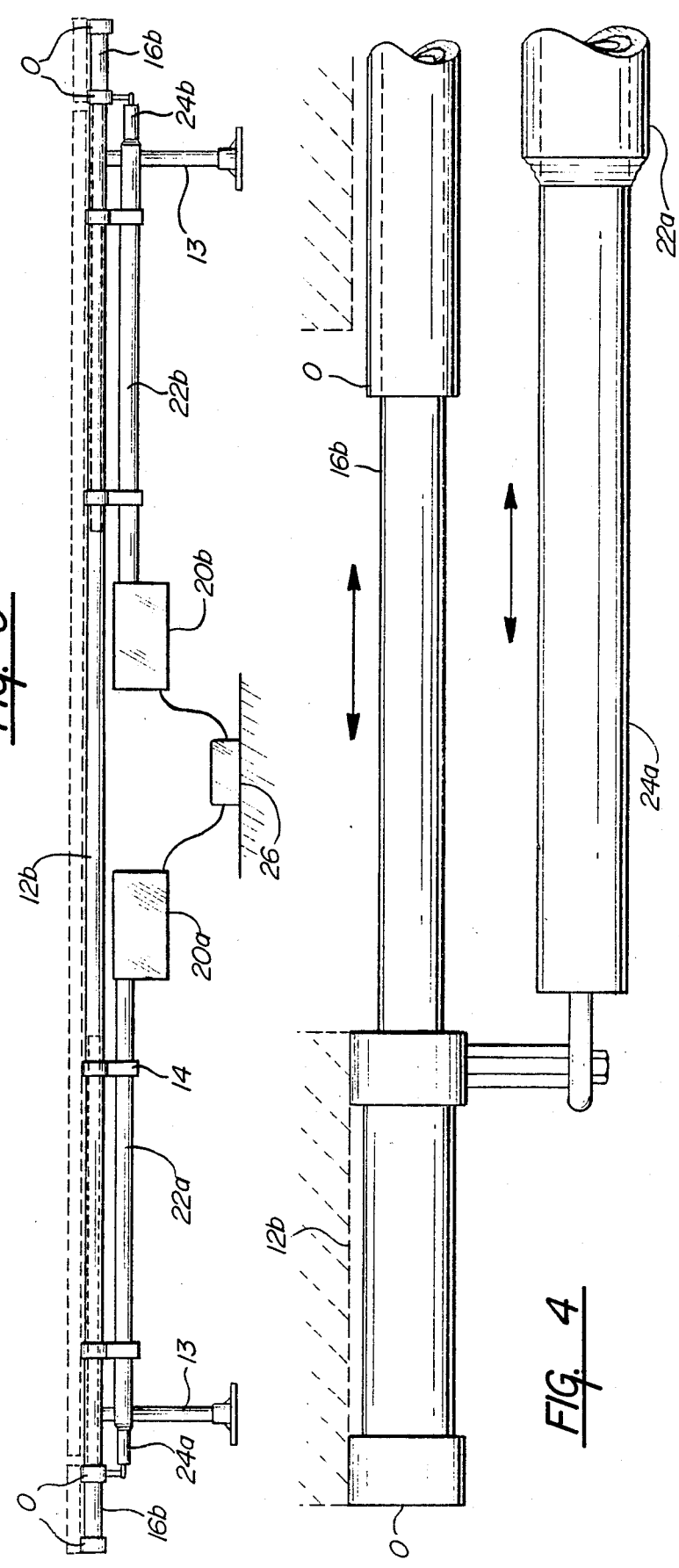

EXPANSIBLE FRAME FOR MOUNTING DOWNRIGGERS

FIELD OF THE INVENTION

This invention relates to the field of fishing devices and more particularly, to an expansible device attachable to the stern of a boat for mounting downriggers or similar fishing rigs thereon.

DESCRIPTION OF THE RELEVANT PRIOR ART

In recent years the popularity of sport fishing for salmon, lake trout and other similar fish has greatly increased due to the development of downrigger systems which permit trolling for fish in deep water. This sport has met with great popularity, particularly with Great Lakes fisherpersons, and has begun to spread to salt water areas such as the Gulf of Mexico.

The typical downrigger system includes a manual or motor driven reel mounted to a base attachable to a boat, upon which reel is wound a downrigger cable. One end of the cable is fixed to the reel. The other end of the cable is connected to a weight and releasably connected by a quick-release device to a fishing line. For examples of patented quick-release devices see U.S. Pat. Nos. 3,765,118; 3,778,918; and 4,696,124. The fishing line is also connected to a conventional fishing rod which, during trolling, normally rests in a rod holder. Also mounted on the base is a downrigger arm or boom that extends out over the water. The arm or boom includes various pulleys and guide assemblies which receive and guide the cable as the cable is raised and lowered into the water.

By means of the reel, downrigger boom and weighted cable, the lure may be lowered to the desired depth during trolling. If a fish "strikes" the lure, the downrigger cable and weight are released by means of the quick-release device to permit the fisherperson to reel in the fish with the fishing rod and line in a conventional manner.

The purpose of the downrigger arm or boom is to ensure that the downrigger cable and fishing line are kept clear from the hull and propeller of the boat. Hence, typically the boom projects for a distance from the boat.

Frequently, those who are fishing desire to operate more than one downrigger system simultaneously while on a fishing trip. However, if the downrigger devices are mounted in too close proximity to each other, the cables and lines are prone to tangling and fouling. They must be mounted a sufficient distance apart, typically around four feet or so. However, the typical stern width of a sport fishing boat is only eight feet. Hence, it is difficult to mount more than two downrigger systems to the same fishing boat. Even on a larger boat, the number of downriggers which can conventionally be mounted thereon is limited by the width of the boat.

Attempts to overcome this problem include downrigger systems wherein the downrigger arm or boom is pivotally attached to the downrigger base. Such pivotal downrigger arms are, typically longer than the fixedly mounted ones. They are intended to be mounted on the aft corners of the boat. Although the spacing between the pivoting, corner-mounted downrigger and an adjacent conventional, fixed downrigger is shorter than normal, the extra-long, pivoting arm adds a sufficient length to the spacing to keep the lines from fouling. Such a downrigger system is described, for example, in U.S. Pat. No. 3,968,857.

However, some tangling and fouling is encountered with such systems, particularly when the boat executes a turn in the water. The pivoting arm tends to pivot toward its neighbor downrigger during the turn and tangling may occur. Additionally, since the downrigger arm or boom is extra long, it can be a difficult and cumbersome operation to reach for and grasp the weighted end of the cable to attach the fishing line and lure thereto.

Others have attempted to solve this problem by providing a mounting bar with spaced rod holders thereon. See U.S. Pat. Nos 4,527,349 and 4,157,803. Even with these systems, the downriggers are mounted at less than optimum distance.

It would be desirable to provide a device wherein more than two conventional downrigger systems could be mounted on a typical eight-foot-wide fishing boat while preserving the optimum spacing therebetween to minimize tangling and fouling.

It would also be desirable to provide such a device wherein an increased number of downriggers could be mounted to any size boat while minimizing tangling and fouling even during turning maneuvers.

It would also be desirable to provide such a device wherein an increased number of downriggers having downrigger arms of conventional length could be used in tandem to make retrieval of the weighted end of the downrigger cable relatively easy.

SUMMARY OF THE INVENTION

The invention described and claimed herein overcomes all of the problems described in the previous section. The invention is a system which expands the stern area of the boat to permit the mounting thereon of more than two downriggers on an eight-foot boat; at least as many as four or five may be mounted by use of the device. The device may also be used on other size boats to permit mounting of a greater number of downriggers than would be possible with conventional mounting.

The claimed device comprises a frame including two parallel and spaced elongated members which extend horizontally across substantially the stern of the boat. A plurality of cross braces interconnect the elongated members to provide a framework. A plurality of brackets are provided to mount the framework to the transom or gunwale of the boat. A pair of opposed expansion means are provided. Each expansion means includes a pair of extensions which are slidably displaceable relative to the pair of elongated members. In a preferred embodiment, the extensions are telescopingly received by the elongated members.

Each pair of extensions is capable of moving from a first position wherein the outboard ends of the extensions are located proximate the outboard ends of the framework to a second position wherein they are displaced in an outboard direction to project out over the water. Like the pairs of elongated members, the pairs of extensions are interconnected by means of cross braces, with the cross braces being disposed proximate the outboard ends thereof so as not to impede reciprocal movement of the extensions with respect to the framework. Each expansion means further includes means for reciprocating the pairs of extensions between the first and second positions. Typically, the reciprocating means comprises a linear actuator such as a conventional electro servo motor. It is contemplated that the piston chamber of the linear actuator will be mounted on the framework and the piston thereof mounted on the extensions. User actuated means are also provided for controlling the reciprocal movement of the extensions. Preferably, the device may be operated such that the extensions may be positioned at locations intermediate the first and second positions depending on how much expanded mounting area is needed.

DETAILED DESCRIPTION OF THE DRAWINGS

The following detailed description may best be understood by reference to the accompanying drawing wherein:

FIG. 2 is a plan view of the expansible mounting device as in FIG. 1 shown demounted from the boat and in a retracted position;

FIG. 3 is a front, elevational view of the mounting device of FIG. 2; and

FIG. 4 depicts a detail of the linear actuator attachment.

DETAILED DESCRIPTION OF THE ILLUSTRATIVE EMBODIMENTS

Figure 1:
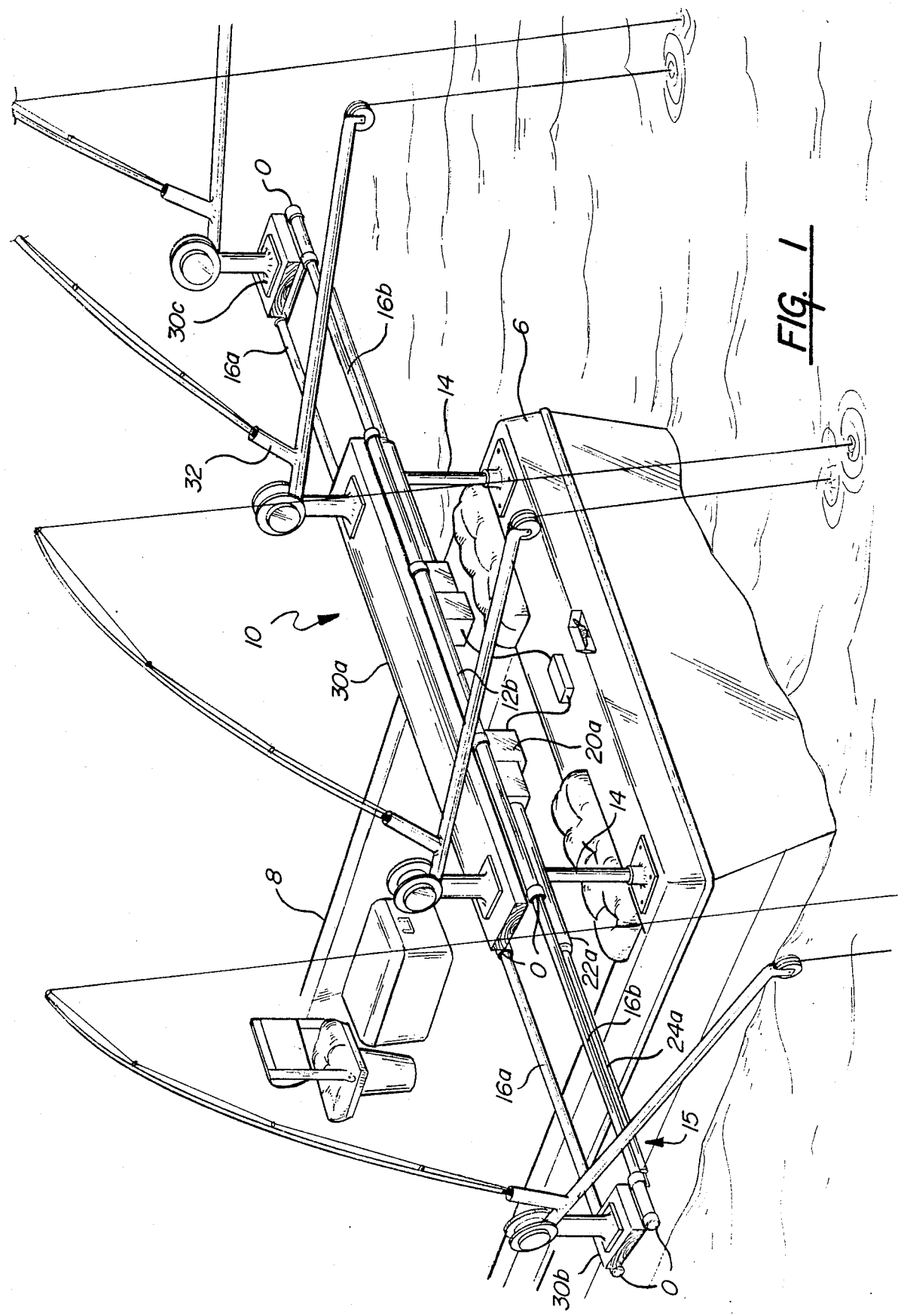
FIG. 1 is a perspective view of an expansible downrigger mounting device mounted on the stern of a boat showing a plurality of downriggers mounted thereon with the expansion means moved to an outboard, trolling position in accordance with the principles of the present invention.

Throughout the following detailed description, like reference numerals are used to refer to the same element of the invention shown in multiple figures thereof.

Referring now to the drawings and in particular to FIGS. 1, 2 and 3 thereof, there is shown an expansible downrigger mounting device 10 according to the instant invention mounted on the stern 6 of a boat 8. Alternatively, the device 10 may be mounted on the gunwale of boat 8, or, as is conventionally provided on boats used in the Great Lakes, on the teakwood board of boat 8.

The downrigger mounting device 10 comprises a frame 11 and a pair of opposed expansion means 15,17. The frame 11 includes a pair of spaced and parallel elongated members 12a and 12b which extend horizontally across substantially the width of the boat 8 proximate the stern 6 thereof. A plurality of cross braces 14 interconnect the pair of elongated members 12a,12b to form a framework. A plurality of brackets 13 attach the framework to the transom 6 of boat 8.

The pair of expansion means are disposed proximate the outboard ends 0 of said frame 11. Each of said pair of expansion means 15,17 comprises a pair of extensions 16a,16b telescopingly receivable by the pair of elongated members 12a,12b. Each pair of extensions 16a,16b is adapted to move from a first position wherein the outboard ends 0' of said extensions 16a,16b are disposed proximate the outboard ends 0' of said frame 11, as is depicted in FIGS. 2 and 3, to a second, extended position wherein the outboard ends 0 of the extensions 16a,16b project outwardly with respect to the outboard ends 0 of the frame 11, as is depicted in FIG. 1. When the expansion members 15,17 are in the second, extended position, an extended surface is provided for the mounting of downriggers or other fishing paraphernalia, as is shown in FIG. 1.

Each expansion means 15,17 further comprises a plurality of cross braces 18 which interconnect each of said pair of extensions 16a,16b. In order not to interfere the movement of the extensions 16a,16b as they telescopingly reciprocate within elongated members 12a,12b in moving from the first position to the second position and back again, cross braces 18 are disposed proximate the outboard ends 0' of extensions 16a,16b. The cross braces 14 interconnected to the elongated members 12a,12b and cross braces 18 interconnecting extensions 16a,16b both provide a convenient means for mounting a mounting platform 30a,30b,30c to expansible downrigger mounting device 10, as best may be seen by referring to FIG. 1. As is conventional, mounting platform 30a,30b,30c comprise appropriate lengths of 2×6 stock lumber. Mounting platform 30a,30b,30c provide a means by which downrigger devices 32 may be attached to the mounting device 10.

Means 20a,20b are provided for reciprocating each of said expansion means 15,17 between the first and second positions. It is contemplated that reciprocating means 20a,20b may be any of an number of widely known devices which are capable of imparting reciprocal linear motion. For example, such a device might comprise a hydraulic cylinder, a chain drive, a worm gear drive, a hand-operated crank, etc. In a particularly preferred embodiment, reciprocating means 20a,20b comprise electro-servo motor linear actuators, such as those sold by the Norock Corporation of Wausau, Wisconsin, said electro-servo motors being sold under the name "HammerBlow." It is contemplated that piston chambers 22a,22b of said linear actuators will be mounted to frame 11 and pistons 24a,24b will be attached to expansion means 15,17, as is depicted in FIG. 4, which depicts a detail of the attachment of piston 24a to extension 12b.

User actuated control means 26 are provided for controlling the reciprocating means 20a,20b between first and second positions. Typically, controller means 26 comprises a double pole, double throw switch which may be mounted to the transom 6 of the boat. Control means 26 is operatively connected to an electrical supply such as a battery (not shown) which is typically carried by the boat 8. Controller 26 is also operatively connected to reciprocating means 20a,20b and is, typically, detachable therefrom by means of plug and socket arrangements. By means of the double pole, double throw switch, the user may extend or retract either or both expansion means 15,17 as desired. Furthermore, although the drawing depicts the device 10 in two positions, it is possible, of course, for the operator to move the extensions 16a,16b to any desired position intermediate the full extended and contracted positions.

As may be seen by referring to FIG. 1, it is possible to mount four or more downriggers 32 to stern 6 of boat 8 by utilizing the device 10 of the present invention in its extended position. The device of the present invention may also be adapted to fit boats of other widths than eight feet. In such cases, the number of downriggers which may be mounted on the device will vary depending on the size of the boat. In all cases, however, use of the device will permit the mounting of more downriggers than would otherwise be possible. Since the downriggers 32 are spaced at an optimum distance when so mounted, far less tangling and fouling of the lines thereof are encountered, even during turning maneuvers. The present device also possesses the advantage of permitting the operator to retract the device as desired, which is particularly useful in performing baiting operations. Also, when the device is in its retracted position, the boat 8 may be moored in a conventional slip.

The invention claimed herein has been described with reference to particular embodiments and exemplifications thereof. Doubtless, variations in the design and arrangements of the elements of the herein invention may occur to one skilled in the art without departing from the spirit of the invention claimed herein. For example, only one elongated member and pair of extensions may be provided, or more than the pair described may be utilized without departing from the scope of the invention. The embodiment depicted shows a pair of expansion members and associated linear actuators, but the invention may be practiced with only one expansion means and linear actuator. The true scope of the present invention is not intended to be so limited, but is limited solely by the claims appended hereto.

What is claimed:

1. An expansible device for mounting fishing rigs such as downriggers thereon mountable on the stern of a boat, said device comprising:
   at least one elongated member adapted to extend horizontally across substantially the width of the boat proximate the stern;
   means for mounting said at least one member on the transom of the boat;
   at least one expansion means including:
      an extension associated with a first end of said elongated member and slidingly engagable with said member, said extension being adapted to move from a first position wherein an outboard end thereof is disposed proximate the first end of said member to a second, extended position wherein said outboard end projects past said first end in an outboard direction to provide an extended surface for the mounting of a fishing rig thereon; and
      means for reciprocating said extension between said first and second positions; and
   operator actuated means for controlling the reciprocating means.

2. The device of claim 1 further comprising a second expansion means association with a second end of said elongated member, the extension of which is adapted to move from a first position to a second position in symmetrical fashion with the movement of the first extension.

3. The device of claim 1 wherein the at least one extension is telescopingly receivable by the elongated member.

4. The device of claim 1 wherein the mounting means comprises at least one bracket mountable to the transom.

5. The device of claim 1 wherein the means for reciprocating comprises a linear actuator.

6. The device of claim 2 wherein the means of reciprocating comprises an electric servo motor.

7. An expansible device for mounting fishing rigs such as downriggers thereon mountable on the stern of a boat, said device comprising:
   at least one elongated member adapted to extend horizontally across substantially the width of the boat proximate the stern;
   means for mounting said at least one member on the transom of the boat; and
   a pair of expansion means associated with a first and a second end of the elongated member, each said expansion means including:
      an extension slidingly engagable with said member, said extension being adapted to move from a first position wherein an outboard end thereof is disposed proximate the associated end of said member to a second, extended position wherein said outboard end projects past said associated end in an outboard direction to provide an extended surface for the mounting of a fishing rig thereon; and
   an electric servo motor for reciprocating said extensions between said first and second positions, said servo motor including a piston chamber mounted on each of the first and second ends of the elongated member and a piston reciprocal with each chamber and mounted on the extension of the associated expansion means.

8. An expansible device for mounting fishing rigs such as downriggers thereon mountable on the stern of a boat, said device comprising:
   a pair of said elongated members disposed in spaced and parallel relation and interconnected by means of a plurality of cross braces to form a frame said frame being adapted to extend horizontally across substantially the width of the boat proximate the stern;
   means for mounting said frame on the transom of the boat; and
   at least one expansion means including:
   an extension associated with a first end of said frame and slidingly engagable with at least one of said pair of members, said extension being adapted to move from a first position wherein an outboard end thereof is disposed proximate the first end of said frame to a second, extended position wherein said outboard end projects past said first end in an outboard direction to provide an extended surface for the mounting of a fishing rig thereon; and
   means for reciprocating said extension between said first and second positions.

9. The device of claim 8 wherein the expansion means further comprises a pair of said extensions, each member of which is slidably associated with one of the pair of elongated members, the pair of extensions being interconnected by a plurality of cross braces disposed proximate the outboard ends of the extensions.

10. An expansible device mountable on the stern of a boat adapted for the mounting of downriggers thereon, said device comprising:
   a frame including:
      a pair of spaced and parallel, elongated members extending horizontally across substantially the width of the boat proximate the stern;
      a plurality of cross braces interconnecting said pair of elongated members to form a framework; and
      a plurality of brackets attached to said framework and mountable on the transom of the boat;
   a pair of opposed expansion members disposed proximate the outboard ends of said framework, each of said pair comprising:
      a pair of extensions telescopingly receivable by the pair of elongated members, the pair of extensions being adapted to move from a first position wherein outboard ends of said extensions are disposed proximate outboard ends of said framework to a second, extended position where the outboard ends of the extensions project outwardly with respect to the outboard ends of the framework to provide an extended surface for the mounting of a fishing rig thereon; and a plurality of cross braces interconnecting each of said pair of extensions proximate the outboard end thereof;

means for reciprocating each said expansion means between said first and second positions; and operator actuated means for controlling each reciprocating means between said first and second positions.

11. The device of claim 10 wherein the reciprocating means comprises a pair of opposed electric servo motors disposed on the frame, each of said servo motor having a piston chamber mounted on the frame and a piston reciprocal with the chamber and mounted on one of the expansion means.

12. The device of claim 10 wherein the controller comprises an electro-mechanical switch operatively connected to both of the pair of electro servo motors.

13. The device of claim 12 wherein the controller means is operatively connected to an electrical supply means carried by the boat.

* * * * *